United States Patent
Yoshimoto (10) Patent No.: US 11,622,048 B2
(45) Date of Patent: Apr. 4, 2023

(54) TECHNIQUE FOR READING IMAGES ON A SHEET CONTROLLING SENSOR BASED ON TWO MEASUREMENTS MODES IN WHICH RESULT CORRESPONDING TO A WAVELENGTH RANGE IS REDUCED OR NOT

(71) Applicant: CANON KABUSHIKI KAISHA, Tokyo (JP)

(72) Inventor: Tetsuhiro Yoshimoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/748,102

(22) Filed: May 19, 2022

(65) Prior Publication Data
US 2022/0385768 A1 Dec. 1, 2022

(30) Foreign Application Priority Data
May 31, 2021 (JP) .............................. JP2021-091806

(51) Int. Cl.
*H04N 1/00* (2006.01)
*H04N 1/60* (2006.01)
*H04N 1/10* (2006.01)
*H04N 1/191* (2006.01)

(52) U.S. Cl.
CPC ..... *H04N 1/00023* (2013.01); *H04N 1/00005* (2013.01); *H04N 1/00015* (2013.01); *H04N 1/00034* (2013.01); *H04N 1/00068* (2013.01); *H04N 1/00822* (2013.01); *H04N 1/6044* (2013.01); *H04N 1/6047* (2013.01); *H04N 1/1008* (2013.01); *H04N 1/191* (2013.01)

(58) Field of Classification Search
None
See application file for complete search history.

(56) References Cited

U.S. PATENT DOCUMENTS

| 8,411,317 | B2 * | 4/2013 | Morikawa | H04N 1/401 358/1.6 |
| 8,908,243 | B2 * | 12/2014 | Takemura | H04N 1/6033 358/1.9 |
| 8,909,072 | B2 * | 12/2014 | Takemura | G03G 15/2039 399/45 |
| 9,020,400 | B2 * | 4/2015 | Furuta | G03G 15/5062 399/49 |
| 9,031,468 | B2 * | 5/2015 | Itagaki | G03G 15/2039 399/195 |

FOREIGN PATENT DOCUMENTS

JP 5901256 B2 4/2016

* cited by examiner

*Primary Examiner* — Scott A Rogers
(74) *Attorney, Agent, or Firm* — Venable LLP (57) ABSTRACT

An image forming system includes an image forming unit, a sensor, and a controller. The controller is configured to control the sensor based on measurement modes including a first measurement mode and a second measurement mode. A sampling number of an image by the sensor while the sensor moves in the direction orthogonal to the conveying direction in the first measurement mode is less than a sampling number of an image by the sensor while the sensor moves in the direction orthogonal to the conveying direction in the second measurement mode.

7 Claims, 11 Drawing Sheets

| C | M | Y | K | L* | a* | b* |
|---|---|---|---|---|---|---|
| 100 | 0 | 0 | 0 | 91 | -48 | -14 |
| 0 | 100 | 0 | 0 | 60 | 98 | -61 |
| 0 | 0 | 100 | 0 | 97 | -22 | 94 |
| 0 | 0 | 0 | 100 | 0 | 0 | 0 |
| 0 | 100 | 100 | 0 | 53 | 80 | 67 |
| 55 | 10 | 85 | 0 | 82 | -62 | 74 |
| ⋮ | ⋮ | ⋮ | ⋮ | ⋮ | ⋮ | ⋮ |

TECHNIQUE FOR READING IMAGES ON A SHEET CONTROLLING SENSOR BASED ON TWO MEASUREMENTS MODES IN WHICH RESULT CORRESPONDING TO A WAVELENGTH RANGE IS REDUCED OR NOT

CROSS-REFERENCE TO RELATED APPLICATIONS

This application claims the benefit of Japanese Patent Application No. 2021-091806, filed May 31, 2021, which is hereby incorporated by reference herein in its entirety.

BACKGROUND OF THE INVENTION

Field of the Invention

The present invention relates to a technique for reading images formed on a sheet, an image forming system and a reading apparatus.

Description of the Related Art

Japanese Patent No. 5901256 proposed to correct lightness and chromaticity of a measurement image formed on a sheet outputted from an image forming apparatus by reading the measurement image with a reading apparatus. The measurement image is prepared in accordance with a correction target, such as image density, gradation, or image forming position. If color information is required for the correction process, the reading apparatus has a spectrophotometric colorimeter.

The spectrophotometric colorimeter has a light source for irradiating a measurement image with light and a light receiving element for receiving light reflected from the measurement image. Generally, a standard light source is adopted as the light source of the spectrophotometric colorimeter. A standard light source is a light source for which the wavelengths of light output from the light source extend over the entire visible wavelength range. Here, if a white LED (light emitting diode) can be adopted instead of a standard light source, it will be possible to provide the spectrophotometric colorimeter at lower cost. However, an inexpensive white LED produces white light by a combination of a blue LED and a phosphor, and can hardly output light on the short wavelength side (for example, in a visible wavelength range of 420 nm or less). Therefore, among cyan and magenta colorimetric results, colorimetric results on the short wavelength side have a variation therebetween. If a measurement image is colorimetrically measured many times, for example, the variability of the colorimetric results may be reduced by a statistical method. However, in exchange for this, the time required for colorimetry increases. The accuracy required for the colorimetric results depends on the application of the colorimetric results. Therefore, shortening of the time for colorimetry may be given priority over the colorimetric accuracy.

SUMMARY OF THE INVENTION

The present invention provides an image forming system. The image forming system may comprise an image forming unit configured to form an image on a sheet, a conveying unit configured to convey the sheet, a sensor configured to move in a direction orthogonal to a conveying direction in which the conveying unit conveys the sheet, and to measure the image on the sheet, and a controller configured to control the sensor based on measurement modes. The measurement modes includes a first measurement mode in which a measurement result corresponding to a predetermined wavelength range is reduced from measurement results of the image, and a second measurement mode in which a measurement result corresponding to the predetermined wavelength range is not reduced from the measurement results of the image. A sampling number of the image by the sensor while the sensor moves in the direction orthogonal to the conveying direction in the first measurement mode is less than a sampling number of the image by the sensor while the sensor moves in the direction orthogonal to the conveying direction in the second measurement mode.

Further features of the present invention will become apparent from the following description of exemplary embodiments (with reference to the attached drawings).

DESCRIPTION OF THE EMBODIMENTS

Hereafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

<Image Forming System>

Figure 1:
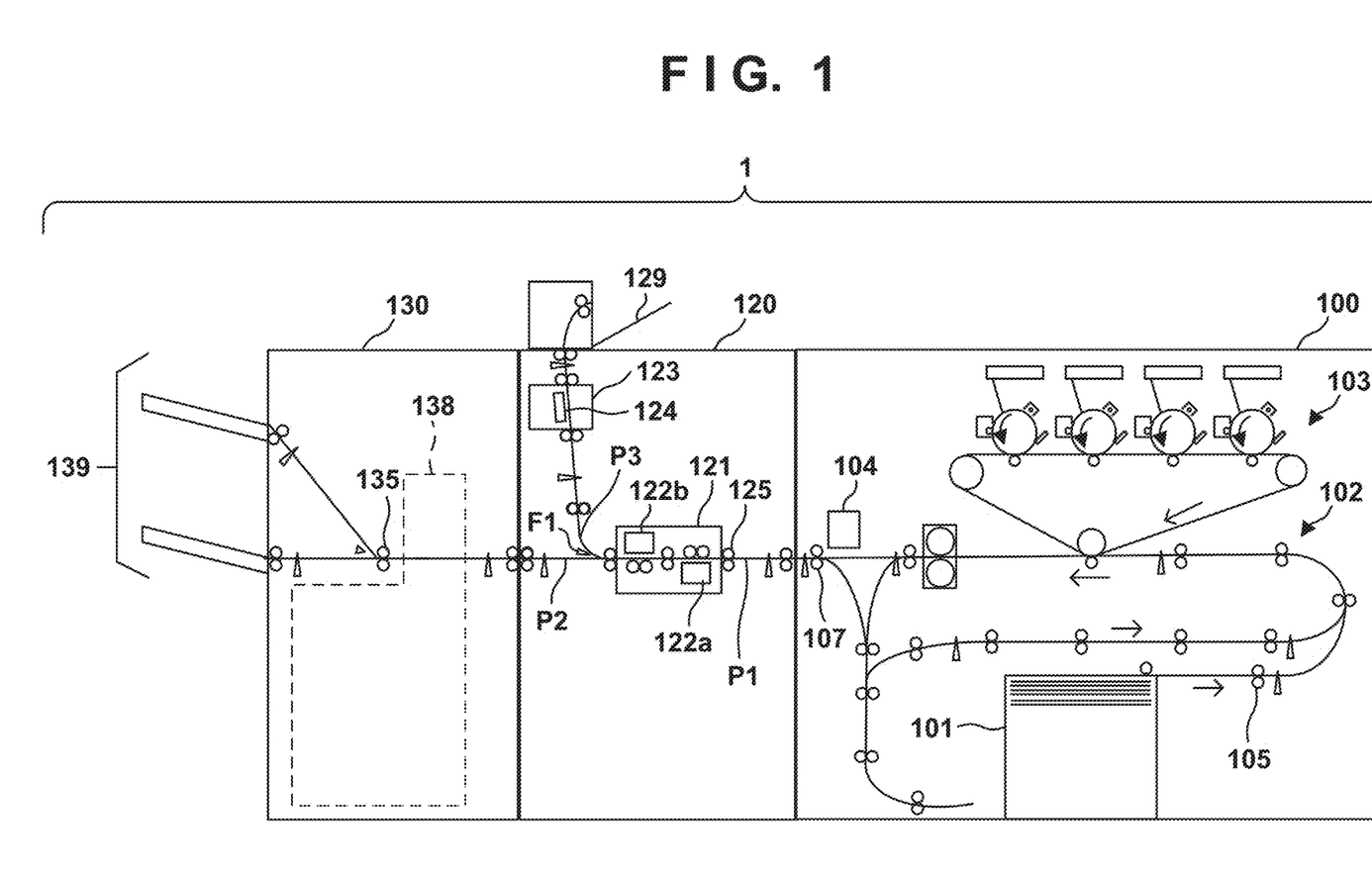
FIG. 1 is a diagram illustrating an image forming system.

As shown in FIG. 1, an image forming system 1 includes an image forming apparatus 100 and one or more post-processing apparatuses. In FIG. 1, an image reading apparatus 120 is coupled to a subsequent stage of the image forming apparatus 100. A finisher 130 is connected at a subsequent stage to the image reading apparatus 120. The image reading apparatus 120 is a post-processing apparatus having a function of measuring a color of an image formed on a sheet and a function of reading an image. The finisher 130 is, for example, a post-processing apparatus that sorts or staples a plurality of sheets.

Image Forming Apparatus

The image forming apparatus 100 shown in FIG. 1 includes a sheet feeding apparatus 101 for feeding a sheet, a conveyance apparatus 102 for conveying the sheet, and a printer 103 for forming an image on the sheet. The conveyance apparatus 102 includes a plurality of conveying roller pairs 105 for conveying a sheet in the conveying path, and a plurality of sheet sensors 106 for detecting the position and passage timing of the sheet in the conveying path. Of the plurality of conveying roller pairs 105, a conveying roller pair disposed at a discharge port of the image forming apparatus 100 may be referred to as a discharge roller 107. The printer 103 forms a test image (after here referred to as a measurement image) or a user image on a sheet.

A user image is an arbitrary image prepared by a user, such as an image of an original read by an image scanner or an image transmitted from a host computer. Measurement images include multiple test patches for color management. A measurement image may include a test patch used for adjusting image forming conditions of the printer 103 (such as a transfer voltage, a charging voltage, a development voltage, or something else). The sheet on which the measurement image is formed may be referred to as a test chart. There may be 1, 2, or more test charts. Although an electrophotographic printer 103 is shown in FIG. 1, other image forming methods such as an inkjet method may be employed as the image forming method. The printer 103 includes a charger for charging a photosensitive drum, an exposer for forming an electrostatic latent image by irradiating the photosensitive drum with a laser beam, a developer for developing the electrostatic latent image with a toner, a transfer device for transferring the toner image to the sheet, and a fixing device for fixing the toner image to the sheet. The transfer device may include an intermediate transfer belt. To form an image on the first surface and the second surface of the sheet, the conveyance apparatus 102 may have an inverting mechanism (inverting conveying path) for inverting the front and back of the sheet. Further, the conveyance apparatus 102 may reverse the image forming surface of the sheet so as to face a vertical direction (downward direction) before discharging the sheet (face-down discharging). A cooling fan 104 is a cooling mechanism for cooling the sheet on which an image is formed. Colorimetric results are temperature dependent (thermochromic). When the cooling fan 104 cools the sheet, a highly accurate colorimetric result is obtained. By the discharge roller 107, the image reading apparatus 120 discharges the sheet.

Image Reading Apparatus

The image reading apparatus 120 includes a colorimetry unit 123 for performing colorimetry of an image formed on a sheet by the image forming apparatus 100, and a reading unit 121 for reading an image formed on the sheet. The colorimetry unit 123 has a colorimetry sensor 124 for performing colorimetry. The colorimetric results of the colorimetry unit 123 are used to generate, to correct or to update a device profile for color management. The reading unit 121 includes an image sensor 122a for reading an image formed on a first surface of a sheet, and an image sensor 122b for reading an image formed on a second surface of the sheet. The reading results of the image sensors 122a and 122b may be used for correcting image forming conditions, or may be used for judging (verifying) whether or not the image formed on the sheet satisfies predetermined pass criteria. Here, the predetermined pass criteria may be image data upon which a user image formed on the sheet is based. Reading results of the image sensors 122a and 122b may include the reading results of a reference mark for specifying a formation position on the sheet of a measurement image for colorimetry. A position at which colorimetry is started by the colorimetry unit 123 is adjusted based on the reading result of the reference mark.

The image reading apparatus 120 has a conveying path P1 for receiving and conveying sheets conveyed from the image forming apparatus 100, and conveying paths P2 and P3 connected to the conveying path P1. The conveying paths P1, P2, and P3 have a plurality of conveying roller pairs 125 for conveying sheets. The reading unit 121 is provided on the conveying path P1. A sheet passing through the conveying path P1 is guided to either conveying path P2 or P3 by a flapper F1. For example, the flapper F1 guides a sheet on which a user image that does not satisfy the pass criteria is formed and a sheet on which a measurement image is formed to the conveying path P3. The flapper F1 guides a sheet on which the user image satisfying the pass criteria is formed to the conveying path P2.

The colorimetry unit 123 is provided on the conveying path P3. A discharge unit 129, which may be referred to as an escape tray, is provided at the trailing end of the conveying path P3. A sheet on which a user image that does not meet the pass criteria is formed and a sheet on which a measurement image is formed are discharged to the discharge unit 129.

Finisher

The finisher 130 has one or more post-processing mechanisms 138 that apply predetermined post-processing (e.g., sorting, stapling, bookbinding, punching, other) to sheets discharged from the image reading apparatus 120 and discharge the sheets to discharge trays 139. The finisher 130 has a plurality of conveying roller pairs 135 for conveying sheets.

<Controller>

Figure 2:
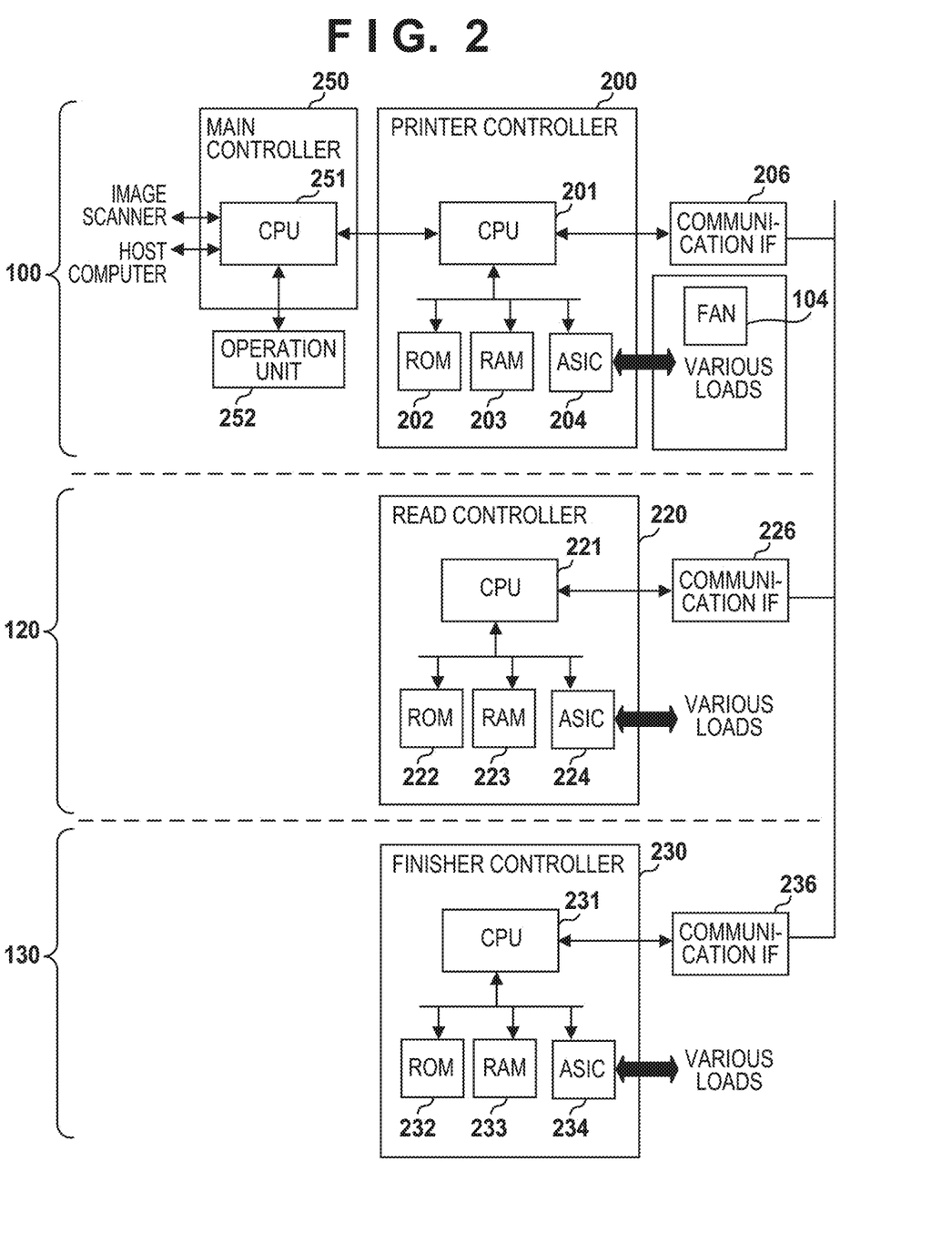
FIG. 2 is a view illustrating controllers.

FIG. 2 shows controllers of the image forming system 1. A printer controller 200 includes a CPU 201, a ROM 202, a RAM 203, and an ASIC 204. The CPU 201 is a processor circuit that executes control programs stored in the ROM 202 to control the sheet feeding apparatus 101, the conveyance apparatus 102, the printer 103, and the cooling fan 104 via the ASIC 204. ASIC is an abbreviation for application specific integrated circuit. The ASIC 204 drives the sheet feeding apparatus 101, the conveyance apparatus 102, the printer 103, and the cooling fan 104 in accordance with instructions from the CPU 201. The CPU 201 communicates with a CPU 251 of a main controller 250. The CPU 251 transmits an instruction input to the operation unit 252 to the CPU 201, or transmits a print job input from the host computer or the image scanner to the CPU 201. The RAM 203 stores image data, variables, and the like. A communication interface 206 is a communication circuit that communicates with a controller mounted on the post-processing apparatus. The communication interface 206 may be connected to parallel signal lines for carrying serial signals and power remote signals. Serial signals may be divided into transmit signals containing instructions and receive signals containing responses corresponding to the instructions. A power remote signal is a signal for activating a post-processing apparatus.

A read controller 220 may be a control board mounted on the image reading apparatus 120. The read controller 220 includes a CPU 221, a ROM 222, a RAM 223, and an ASIC 224. The CPU 221 sends instructions to the ASIC 224 by executing the control program stored in the ROM 222. The ASIC 224 drives loads (the pair of conveying rollers 125, the reading unit 121, and the colorimetry unit 123) in accordance with an instruction from the CPU 221. A communication interface 226 is also a communication circuit connected to parallel signal lines. The communication interface 226 transmits a read result of the reading unit 121 and a colorimetric result of the colorimetry unit 123 to the printer controller 200 via the communication interface 226.

A finisher controller 230 is a control board mounted on the finisher 130. The finisher controller 230 includes a CPU 231, a ROM 232, a RAM 233, and an ASIC 234. The CPU 231 sends an instruction to the ASIC 234 by executing the control program stored in the ROM 232. The ASIC 234 drives the pair of conveying rollers 135 and post-processing mechanisms (a sorter mechanism, a punching mechanism, a stapling mechanism, a bookbinding mechanism, other) according to this instruction. The communication interface 236 is also a communication circuit connected to parallel signal lines. The CPU 231 receives instructions from the CPU 201 through the communication interface 236 and sends responses to the CPU 201. Instructions include, for example, a post-processing execution instruction.

<Details of the Read Controller>

Figure 3:
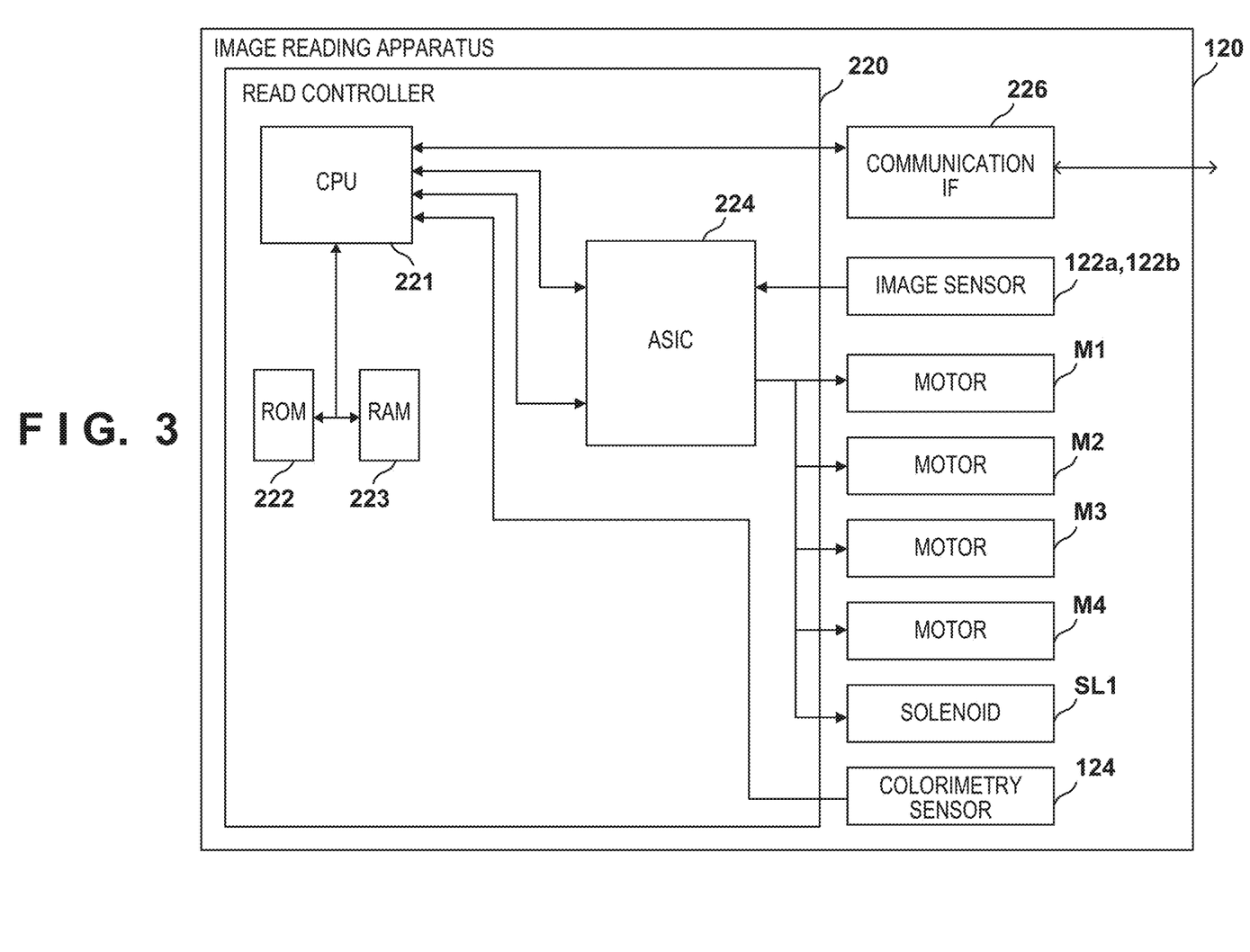
FIG. 3 is a view illustrating an image reading apparatus.

As shown in FIG. 3, the image reading apparatus 120 may be provided with the ASIC 224. The ASIC 224 controls the image sensors 122*a* and 122*b* according to instructions from the CPU 221, and transfers the image signals outputted from the image sensors 122*a* and 122*b* to the CPU 221. Also, the motors M1, M2, M3, and M4 and a solenoid SL1 are connected to the ASIC 224. The motor M1 is a driving source for driving the plurality of conveying roller pairs 125. The motor M2 is a motor that causes the image sensors 122*a* and 122*b* to perform sub-scanning or main scanning relative to the sheet. The motor M3 is a motor for causing the colorimetry unit 123 to perform a main scan relative to the sheet. The motor M4 is a motor for causing the colorimetry unit 123 to perform a sub scan relative to the sheet. A solenoid SL1 drives the flapper F1.

In FIG. 3, the colorimetry unit 123 is connected directly to the CPU 221. The CPU 221 may temporarily retain colorimetric results in the RAM 223 and then forward them to the CPU 201. For example, if the number of test charts is K (K is an integer greater than or equal to 2), the CPU 221 may collectively transfer to the CPU 201 the colorimetric results of K test charts after the colorimetric results of the K test charts are retained in the RAM 223. The CPU 201 of the printer controller 200 corrects the device profile for color management based on the colorimetric results of the K test charts.

The CPU 221 transfers the result of reading a first surface by the image sensor 122*a* and the result of reading a second surface by the image sensor 122*b* to the CPU 201. The CPU 201 may obtain an image forming position of the first surface based on the result of reading the first surface and an image forming position of the second surface based on the result of reading the second surface, and determine whether or not the image forming position of the first surface and the image forming position of the second surface are the set positions, respectively (front and back registration). Note that the determination of image forming positions may be performed by the CPU 221. In this case, the CPU 221 transmits the determination result to the CPU 201.

<CPU Functions>

Figure 4A:
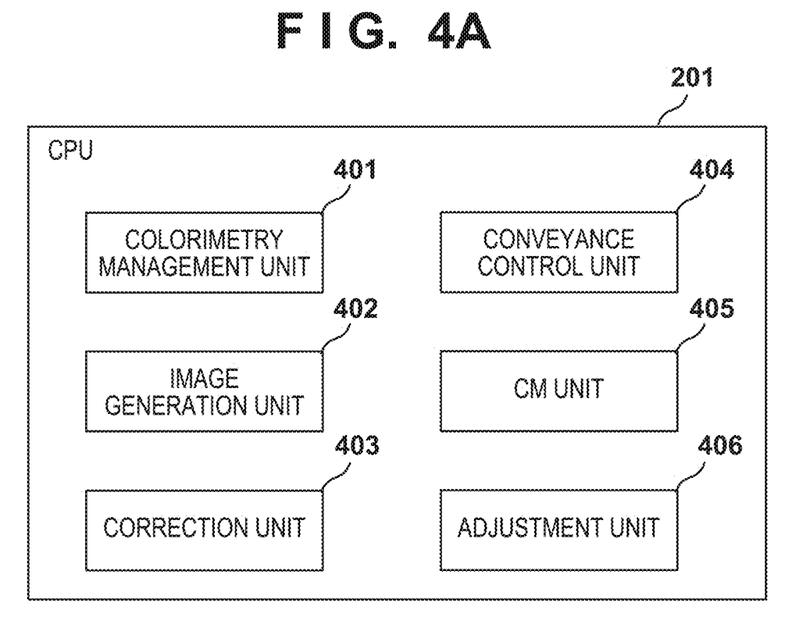
FIGS. 4A and 4B are views for describing CPUs.

FIG. 4A illustrates functions of the CPU 201 of the printer controller 200. The CPU 201 realizes the following functions by executing a control program. A colorimetry management unit 401 determines whether or not a condition for starting correction of a device profile for color management stored in the ROM 202 or the RAM 203 is satisfied. The correction start condition may be, for example, that a device profile correction instruction is inputted from the operation unit 252. When the correction start condition is satisfied, the colorimetry management unit 401 controls an image generation unit 402 to form a measurement image on the sheet. The image generation unit 402 generates image data of the measurement image, or reads out the image data from the ROM 202 to generate an image signal, and outputs the image signal to the printer 103. A conveyance control unit 404 instructs the sheet feeding apparatus 101 to feed a sheet, and instructs the conveyance apparatus 102 to convey a sheet. The colorimetry management unit 401 transmits a colorimetry start instruction to the image reading apparatus 120 in order to execute colorimetry on a sheet on which a measurement image is formed. The colorimetry management unit 401 receives a colorimetric result by transmitting a colorimetric result transmission command to the image reading apparatus 120. A correction unit 403 generates, corrects, or updates the device profile based on the received colorimetric result. As a result, a CM unit 405 converts the image data of the user image using the corrected final device profile (destination profile). CM is an abbreviation for color management. An adjustment unit 406 corrects image forming conditions based on a result of reading a measurement image for correcting the image forming condition. The adjustment unit 406 may adjust the laser beam of the printer 103 based on the detection result of the colorimetry unit 123 so that the image density is uniform for each main scanning position.

Figure 4B:
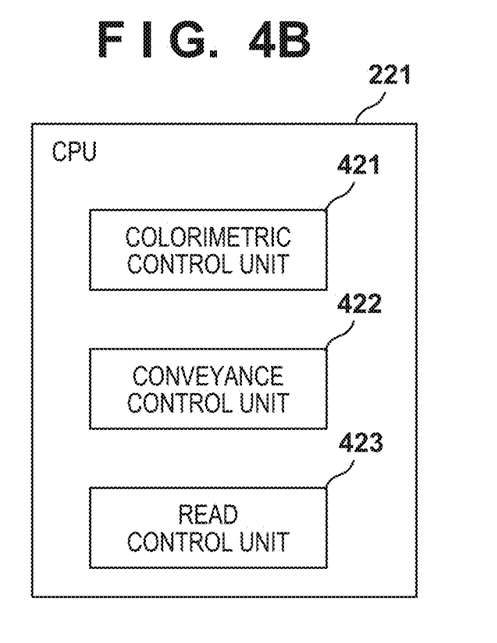

FIG. 4B illustrates functions of the CPU 221 of the read controller 220. The CPU 221 realizes the following functions by executing a control program. Upon receiving a colorimetry start instruction transmitted from the CPU 201, the colorimetric control unit 421 switches the flapper F1 to guide, to the conveying path P3, a sheet on which a measurement image is formed. The colorimetric control unit 421 controls the colorimetry unit 123 to acquire colorimetric results of the measurement image, and stores them in the RAM 223. The conveyance control unit 422 drives the conveyance roller pair 125 and the like in accordance with a conveyance instruction received from the CPU 201. The read control unit 423 controls the image sensors 122*a* and 122*b* in accordance with a read command from the CPU 201 to acquire a result of reading a user image, and transmits the result to the CPU 201.

<Colorimetry Unit>

Figure 5:
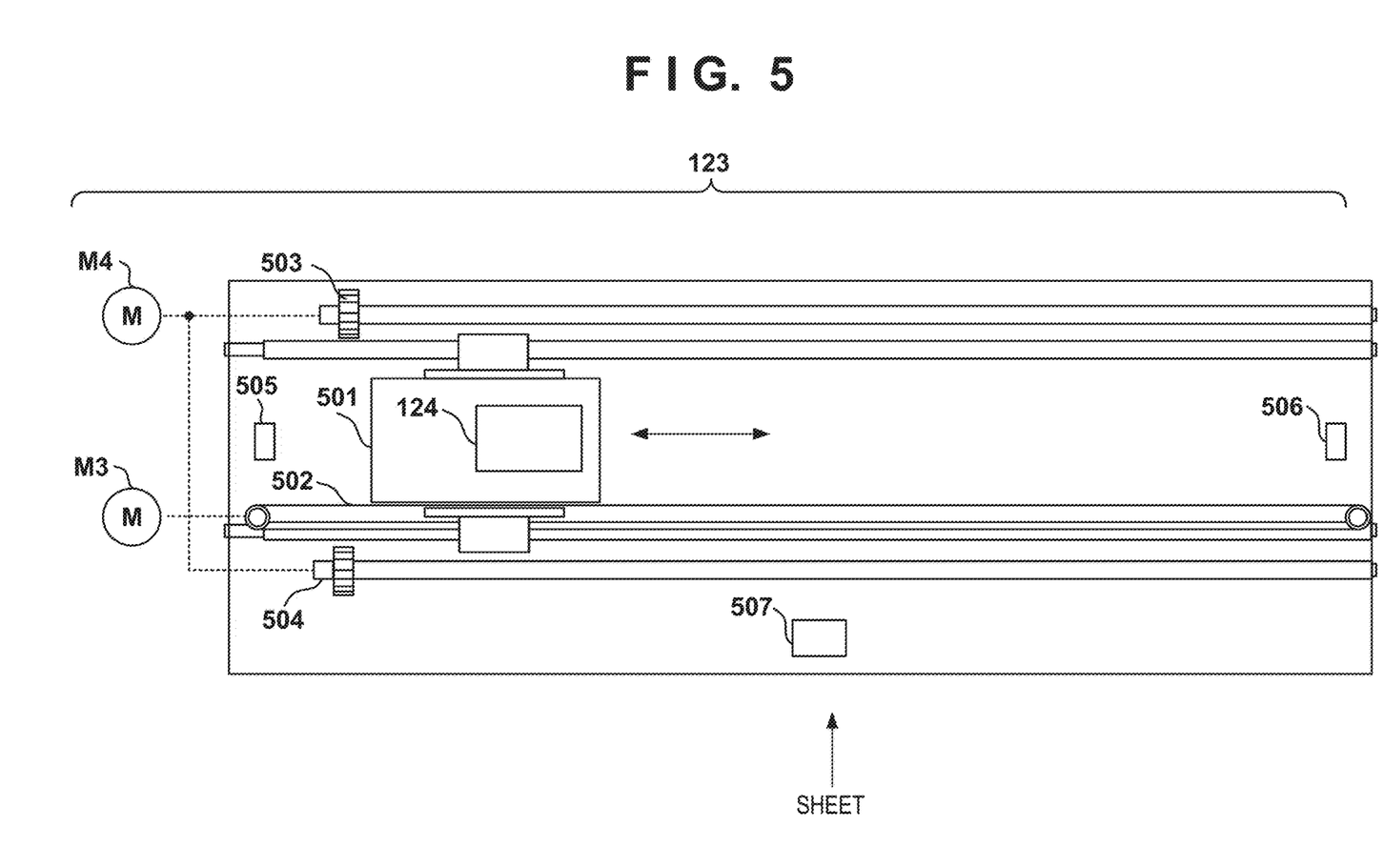
FIG. 5 is a view illustrating a colorimetry unit.

FIG. 5 shows the configuration of the colorimetry unit 123. A carriage 501 is mounted with a colorimetry sensor 124 and moves in a main scanning direction (a first direction from left to right in FIG. 5) or in a direction opposite to the main scanning direction (a second direction from right to left in FIG. 5). The motor M3, by driving a conveyor belt 502 by rotating in the CW direction/CCW direction, causes the carriage 501 to move in the first direction/second direction. Thus, the main scanning of the colorimetry sensor 124 is realized. CW means clockwise. CCW means counterclockwise. A home position sensor 505 is provided at the left end of the colorimetry unit 123 in FIG. 5 and detects that the carriage 501 is positioned at the left end in the main scanning direction. A home position sensor 506 is provided at the right end of the colorimetry unit 123 in FIG. 5 and detects that the carriage 501 is positioned at the right end in the main scanning direction. For example, the CPU 221 rotates the motor M3 in the CW direction until the home position sensor 506 detects the carriage 501. Next, the CPU 221 rotates the motor M3 in the CCW direction until the home position sensor 505 detects the carriage 501.

Sub-scanning of the colorimetry sensor 124 is realized by the motor M4 driving the conveying rollers 503 and 504. When a sheet sensor 507 detects the leading end of the sheet, the conveyance control unit 422 drives the motor M4 to convey the sheet to a predetermined colorimetry position and stop. For example, the conveyance control unit 422 may determine the driving time of the motor M4 based on the position information of the measurement image specified by the reading unit 121. Thus, the colorimetry sensor 124 is positioned above the measurement image on the sheet. When the measurement of one line of the measurement image aligned in parallel with the main scanning direction is completed, the CPU 221 drives the motor M4 to move the sheet by one line. In this manner, sub-scanning is realized. The colorimetry unit 123 measures a plurality of measurement images arranged in two dimensions on the sheet by alternately executing main scanning and sub-scanning.

<Configuration of the Colorimetry Sensor>

Figure 6A:
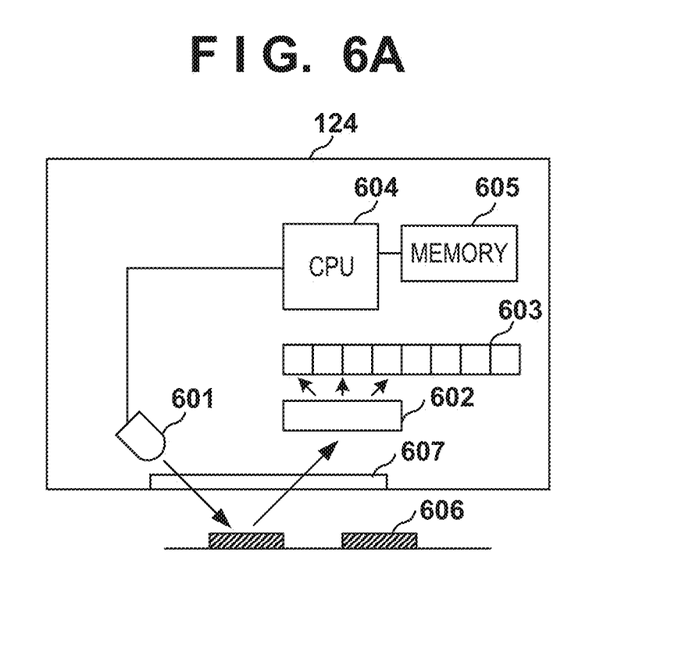
FIGS. 6A and 6B are views for describing a colorimetry sensor.

FIG. 6A shows the configuration of the colorimetry sensor 124. An LED 601 is a light source (e.g., white light emitting diode) that illuminates the illumination light (white light) toward the target. Light (reflected light) reflected by a measurement image 606 through a transparent glass window 607 is incident on a diffraction grating 602. The diffraction grating 602 separates the incident reflected light into respective wavelengths. A line sensor 603 is a light detecting element having n light receiving elements for detecting the light divided into the respective wavelengths by the diffraction grating 602. For example, the n light receiving elements handle one of n wavelength ranges obtained by equally dividing a wavelength range (visible wavelength range) of 400 nm to 700 nm.

A CPU 604 controls the amount of light emission by the LED 601 and executes a predetermined calculation with respect to an output value (detection result) output from each pixel of the line sensor 603. Output values vary according to the intensity of the light received by each pixel (light intensity value). The calculation of the CPU 604 includes calculation of the spectral reflectance from the output value of each pixel, calculation of each value of L*, a*, and b* from the spectral reflectance (chromaticity and lightness), and the like. Here, the values L*, a*, and b* in the following description are described as an L*a*b* value. For example, the CPU 604 may calculate L*a*b* values by inputting the spectral reflectance to a predetermined function (example: a color matching function). The spectral data may be any of these calculation results, or may be the output values of the respective pixels of the line sensor 603. Spectral data is stored in a memory 605. Spectral reflectance has 31 wavelength component data per 10 nm within a range of 400 nm to 700 nm for one measurement image (for n=31). Each wavelength component data is represented by twenty-four bits. Therefore, one spectral reflectance is ninety-three bytes of data. The L*a*b* value is composed of a 24-bit L* value, a* value, and b* value for each measurement image. Thus, one L*a*b* value is nine bytes of data. When using the output value of each pixel of the line sensor 603 as the spectral data, the spectral data includes an output value of each pixel corresponding to the measurement result of the measurement image, and an output value of each pixel corresponding to the measurement result of a reference member (not shown).

For example, when the CPU 221 requests spectral data, the CPU 604 reads spectral data stored in the memory 605 and transmits it to the CPU 221. Also, for example, when the CPU 221 requests an L*a*b* value, the CPU 604 reads an L*a*b* value stored in the memory 605 and transmits it to the CPU 221. Here, the spectral reflectance and the L*a*b* values are acquired as spectral data in the CPU 604, but they may be calculated from the output values of the respective pixels in the CPU 221. Alternatively, the CPU 604 may calculate a spectral reflectance based on the output value of each pixel and transmit the spectral reflectance to the CPU 221, and the CPU 221 may calculate an L*a*b* value from the spectral reflectance.

Figure 6B:
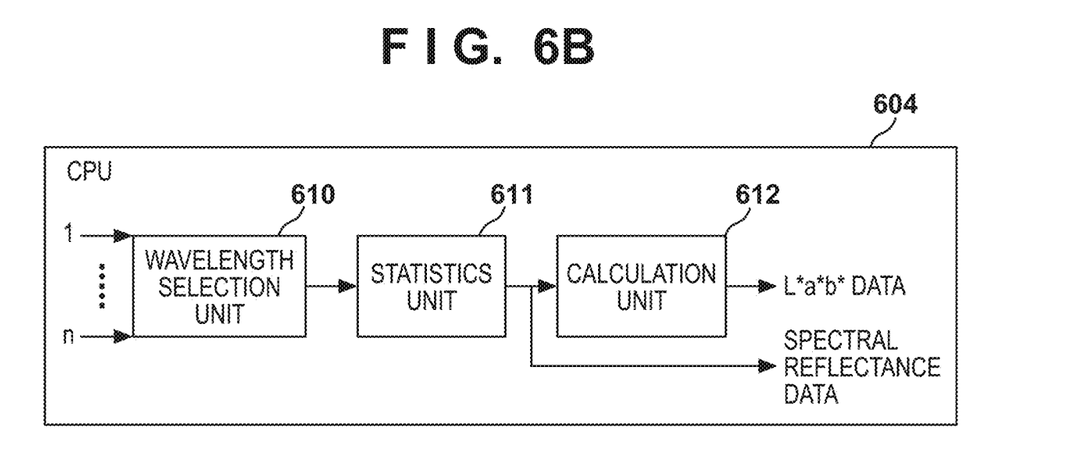

FIG. 6B shows functions of the CPU 604. A wavelength selection unit 610 selects, out of the n measurement results output from the n light receiving elements provided in the line sensor 603, a measurement result to be used to obtain a spectral reflectance depending on the measurement mode. The n measurement results respectively correspond to n different wavelength ranges within a range of 400 nm to 700 nm. For example, when a simple mode is specified, the wavelength selection unit 610 selects measurement results for the wavelength range other than the wavelength range from 400 nm to 420 nm, and passes the measurement results to a statistics unit 611. When a detailed mode is specified, the wavelength selection unit 610 selects measurement results for all wavelength ranges from 400 nm to 700 nm, and passes the measurement results to the statistics unit 611. The statistics unit 611 performs statistical processing on the measurement results, and generates a spectral reflectance based on the statistical processing result. For example, when N measurements are performed for one measurement image, the statistics unit 611 may calculate an average value of N measurement results. The calculation unit 612 obtains the L*a*b* value based on the spectral reflectance. For example, the calculation unit 612 may have a color matching function, and calculate L*a*b* values by inputting the spectral reflectance to the color matching function. Whether the CPU 604 sends a spectral reflectance or an L*a*b* value to the CPU 221 depends on the measurement content specified by the CPU 221.

<Density Adjustment>

Figure 7A:
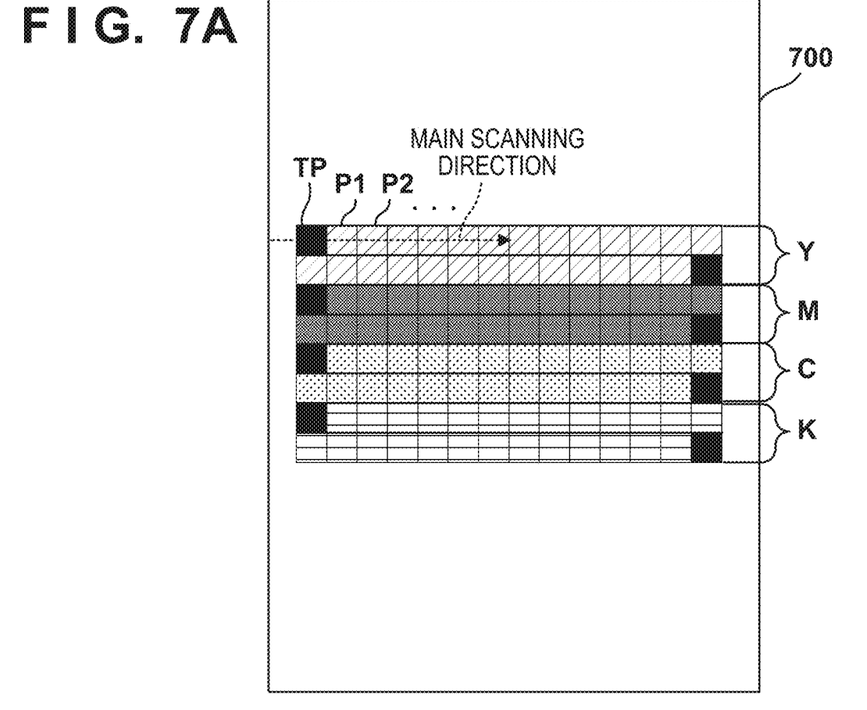
FIGS. 7A and 7B are views for describing a test chart.

FIG. 7A shows a test chart 700 for correcting the density of toner images in the main scanning direction. For example, in the electrophotographic method, there are cases when images of the same density are not formed even when laser beams of the same intensity are irradiated at different positions in the main scanning direction. Therefore, the image data is corrected so that the same density will be formed at each main scanning position. Note that, instead of correcting the image data, for each main scanning position, the reference value of the laser beam may be changed, and the characteristics of the optical system through which the laser beam passes may be changed.

In the test chart 700, two lines of measurement images Pi of predetermined densities are arranged for each of the toner colors Y (yellow), M (magenta), C (cyan), and K (black). And, i is an index for identifying each measurement image, e.g., a value from one to twenty-four. Twenty four measurement images are formed per line on an A3 size sheet. A predetermined number of measurements (e.g., N) are performed per measurement image Pi, and one statistic value (e.g., an average value) is calculated from the N measurement results by statistical processing. This statistic may be referred to as a density value or a spectral reflectance. The colorimetry unit 123 measures the measurement images of the first line while moving the carriage 501 from left to right, and then measures the measurement image of the second line while moving the carriage 501 from right to left. The CPU 604 may calculate statistic values of various scanning positions from the measurement results for two lines at each main scanning position (twenty-four positions).

In FIG. 7A, trigger patches TP are provided at the left end of the first line and the right end of the second line, respectively. The trigger patch TP is an optical start mark indicating the start of measurement to the colorimetry unit 123. Therefore, for the measurement image at the left end and the measurement image at the right end, a statistic value is calculated from the measurement results for one line, respectively. As described above, the measurement results of the trigger patch TP are used for the determination of the start of colorimetry, and are not used for the statistical processing of density values.

Figure 7B:
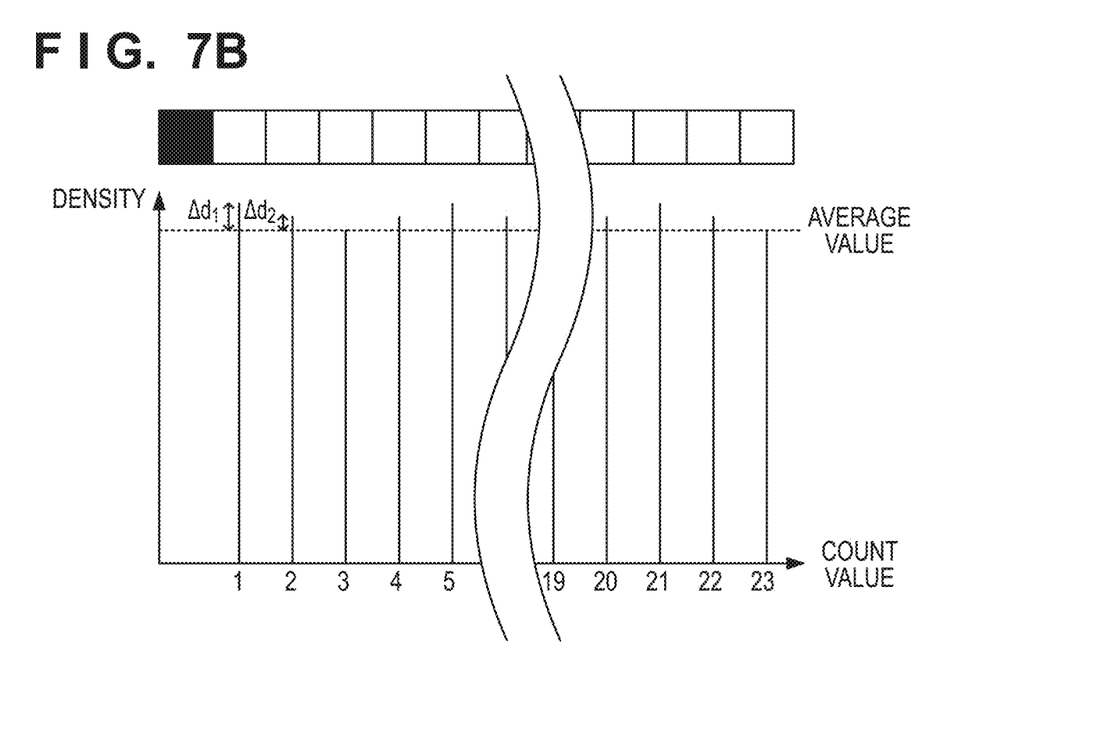

FIG. 7B shows examples of density measurement results for one line. The average density is calculated by dividing the sum of the densities of the twenty-three measurement images excluding the trigger patch TP by twenty-three. The difference between the density di of each measurement image and the average density AVE is represented by Δdi.

The laser power of the image forming apparatus 100 is corrected based on the density difference Δdi thus obtained. As a result, the density of the toner image at each main scanning position is equalized.

Figure 8A:
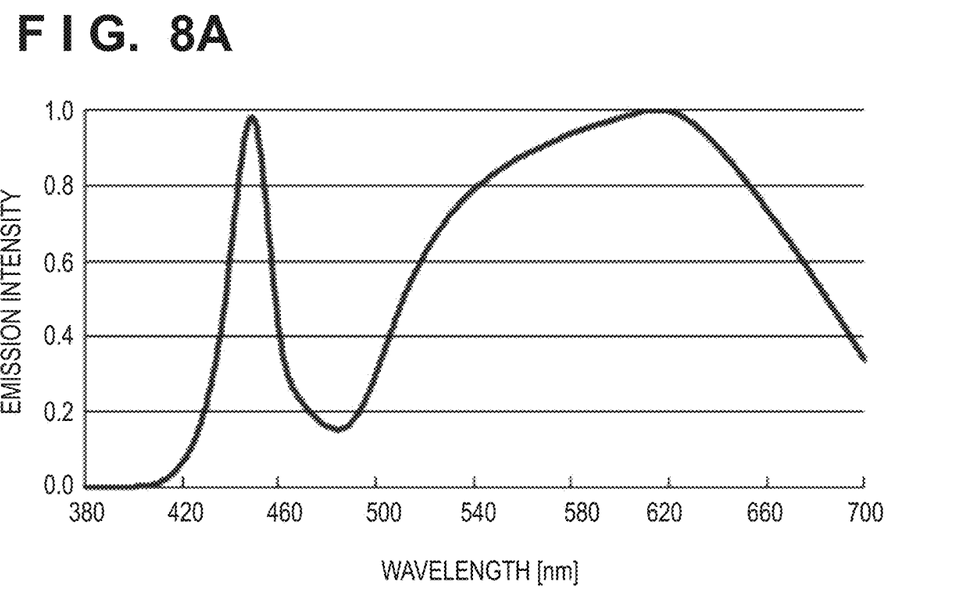
FIGS. 8A and 8B are views illustrating a spectral reflectance in relation to an emission intensity characteristic of a light source and each toner color.

FIG. 8A illustrates a light emission characteristic of the LED 601. Wavelength ranges (e.g., 400 nm to 420 nm) in which the emission intensity of the LED 601 is low and the S/N ratio of the colorimetry sensor 124 is low may be used. Here, S/N ratio is an abbreviation of signal-to-noise ratio. In this case, variations occur in the measurement results. In other words, even if repeated measurement is performed, the reproducibility of a measurement result is low. As a result, the accuracy of a density measurement is lower.

Figure 8B:
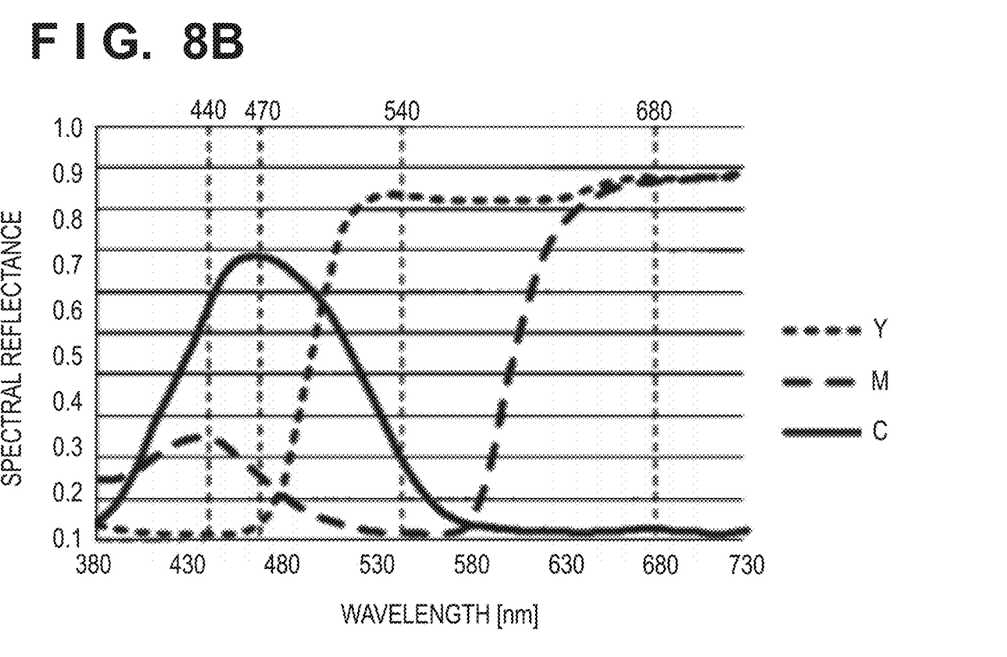

FIG. 8B shows examples of measurement results of spectral reflectances for yellow, magenta, and cyan. As FIG. 8B illustrates, the spectral reflectance of the magenta toner and the spectral reflectance of the cyan toner each has wavelength components from 400 nm to 420 nm. In the wavelength range of 400 nm to 420 nm, the emission intensity of the LED 601 is low. Therefore, in magenta and cyan, measurement results will vary greatly.

The statistical method described above is effective at reducing the variation in the measurement results. For example, the S/N ratio is improved by increasing the number of measurements. Alternatively, the measurement results in the wavelength range of 400 nm to 420 nm may be removed or reduced by the CPU 604 or the CPU 221. In the latter instance, the CPU 604 (wavelength selection unit 610) may remove the measurement results of the light-receiving elements, out of the n light-receiving elements in the line sensor 603, that handle the wavelength range of 400 nm to 420 nm.

In density correction, the accuracy of the relative values between a plurality of measurement results may be high, and the absolute accuracy of each measured density may be low. By not using measurement results of the wavelength range of 400 nm to 420 nm, the number of measurements of the measurement images may be reduced. When the number of measurements is reduced, the time required for colorimetry per line is also reduced. Therefore, the waiting time of the user is reduced, and convenience is improved for the user.

For example, the colorimetry sensor 124 may perform M (less than N; example: M=5, N=10) measurements for each measurement image. The CPU 604 (statistics unit 611) calculates a statistic value of the M measurement results obtained for each of the measurement images as the spectral reflectance. Further, the CPU 604 transmits spectral reflectance of 430 nm to 700 nm to the CPU 221. The CPU 221 calculates the density based on the received spectral reflectance. As a result, the density of each main scanning position can be calculated from a spectral reflectance from which components in the wavelength range of 400 nm to 420 nm are removed or reduced.

The wavelength range of 400 nm to 420 nm is merely an example of the wavelength range to be removed or reduced, and other wavelength ranges may be removed or reduced. In FIG. 8A, when the emission intensity for each wavelength is normalized by setting the highest emission intensity in a visible wavelength range (400 nm to 700 nm) to one, a wavelength range having an emission intensity of a predetermined value (example: 0.1) or less may be selected as a target to be removed or reduced.

<Generate ICC Profile>

Figure 9A:
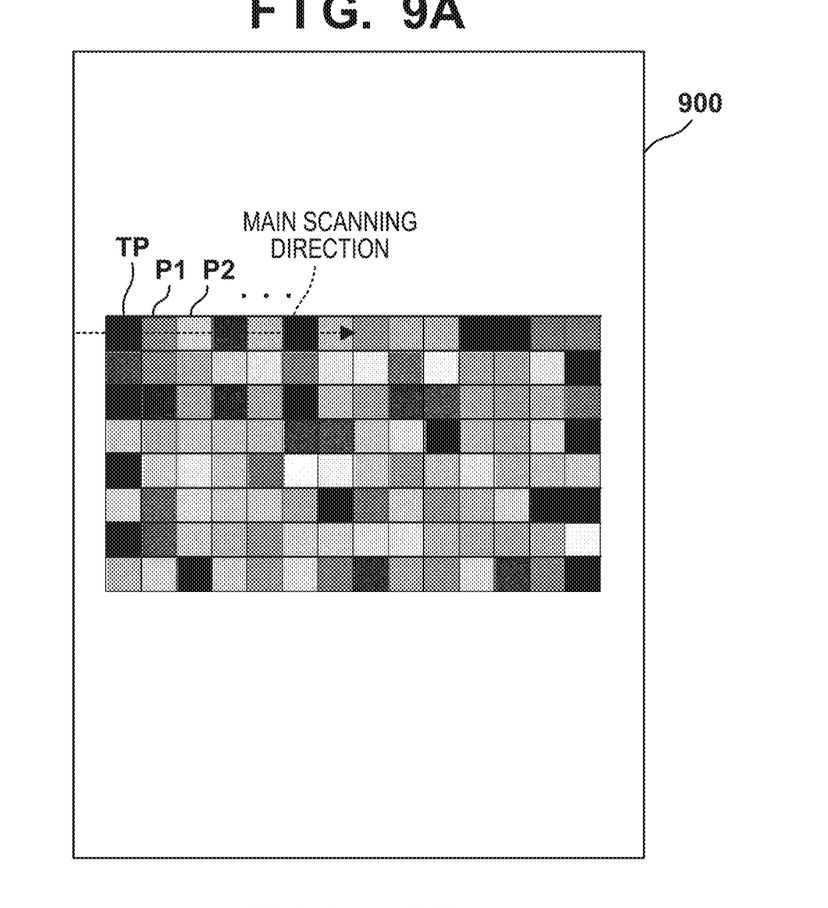
FIGS. 9A and 9B are views for describing a test chart and an ICC profile.

FIG. 9A shows a test chart 900 for generating an ICC profile. ICC is an abbreviation for International Color Consortium. The ICC profile has a source profile and a destination profile. A source profile is a device profile that is provided for each input device, such as an image scanner. Image data acquired by the image scanner is converted according to the source profile into image data in a color space independent of the input device. Further, the image data in the color space independent of the input device is converted into image data corresponding to a color space of an output device by a destination profile prepared for each output device such as the image forming apparatus 100. This ensures color reproducibility of the output image with respect to the input image.

Test chart 900 includes, among other things, a plurality of measurement images Pj necessary to generate a destination profile. j is an index. The measurement images Pj are formed by combining various densities of YMCK. For example, the measurement images Pj include measurement images of 1617 colors defined by ISO 12642-2. The colorimetry sensor 124 measures the respective measurement images Pj to obtain spectral data, and further calculates a L*a*b* value from the spectral data. The L*a*b* value is transferred from the CPU 604 through the CPU 221 to the CPU 201. The correcting unit 403 of the CPU 201 generates a CMYK-L*a*b* conversion table based on the L*a*b* values.

Figure 9B:
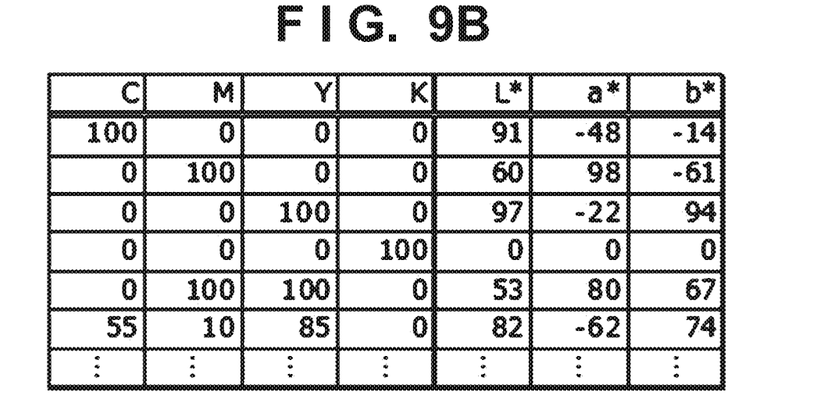

FIG. 9B shows an exemplary CMYK-L*a*b* conversion table. The CMYK-L*a*b* conversion table is stored in the ROM 202 as a destination profile. The CPU 201 uses the CMYK-L*a*b* conversion table stored in the ROM 202 to convert the image data of the device independent color space into image data corresponding to the color space of the image forming apparatus 100.

Figure 10:
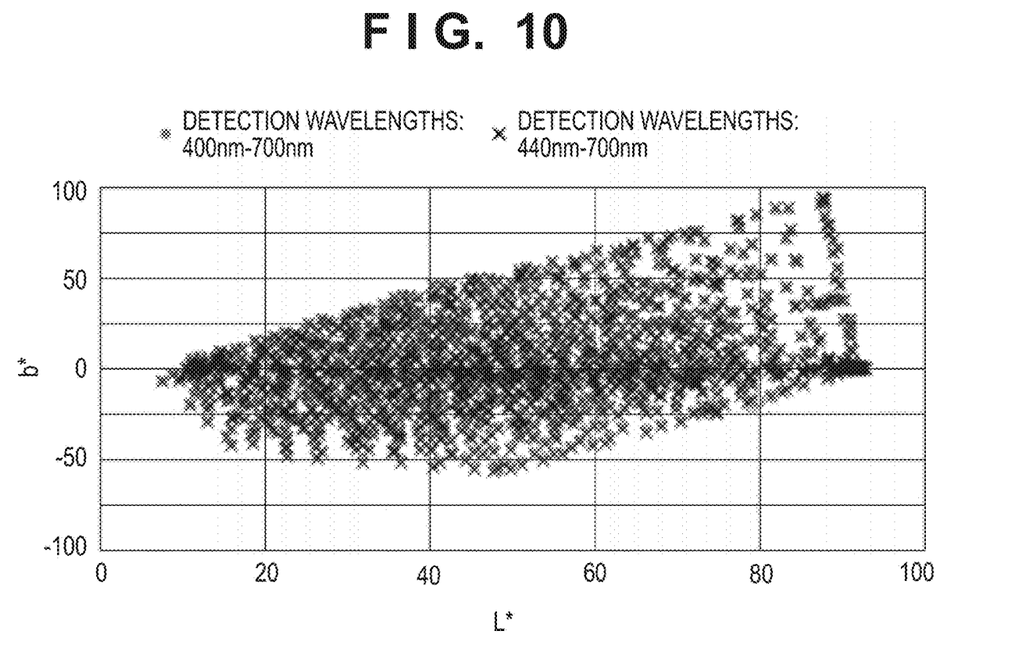
FIG. 10 is a diagram showing color space characteristics according to differences in detection wavelengths.

FIG. 10 shows an example of color reproducibility when the detection wavelengths are different. Here, detection values in the L*-b* plane are shown. In FIG. 10, a light circle mark indicates a detection value when the detection wavelength is 400 nm to 700 nm (i.e., the entire visible wavelength range). X represents a detection value when the detection wavelength is 420 nm to 700 nm. Thus, when measurement is performed for the L*a*b* color space, subtle differences occur in the measurement results because the detection wavelength range is limited. In particular, it is difficult to accurately convert the color space of the destination profile generated using detection values when the detection wavelength is 420 nm to 700 nm.

Thus, in cases when accurate colorimetric results (absolute accuracy) are required, such as when generating a destination profile, the range of detection wavelengths should not be limited. Furthermore, the number of measurements N of the measurement image for generating the destination is set to be greater than the number of measurements M of the measurement image for density correction. This improves the S/N ratio of the measurement. For example, the colorimetry sensor 124 performs colorimetry N times (example: N=10) for one measurement image. The CPU 604 computes a statistical value (example: an average value) of the N measurement results for one measurement image. The CPU 604 converts the statistical value (spectral reflectance) into a L*a*b* value by inputting it into a color matching function. The CPU 604 sends the L*a*b* value to the CPU 221. The CPU 221 generates a destination profile based on the relationship between the YMCK image data used to generate the measurement image Pj and the L*a*b* values acquired from the measurement image Pj.

Thus, by variably controlling the detection wavelength range and the number of measurements (the number of times of colorimetry) according to the measurement mode, an appropriate colorimetry operation is executed for each measurement mode. As a result, the measurement time is reduced in a simple measurement mode with a narrow detection wavelength range, thereby improving the convenience of the user. In the detailed measurement mode, with a wide detection wavelength range, more accurate measurement results can be obtained. For example, a conversion table capable of more accurately converting a color space can be generated.

<Flowchart>

Figure 11:
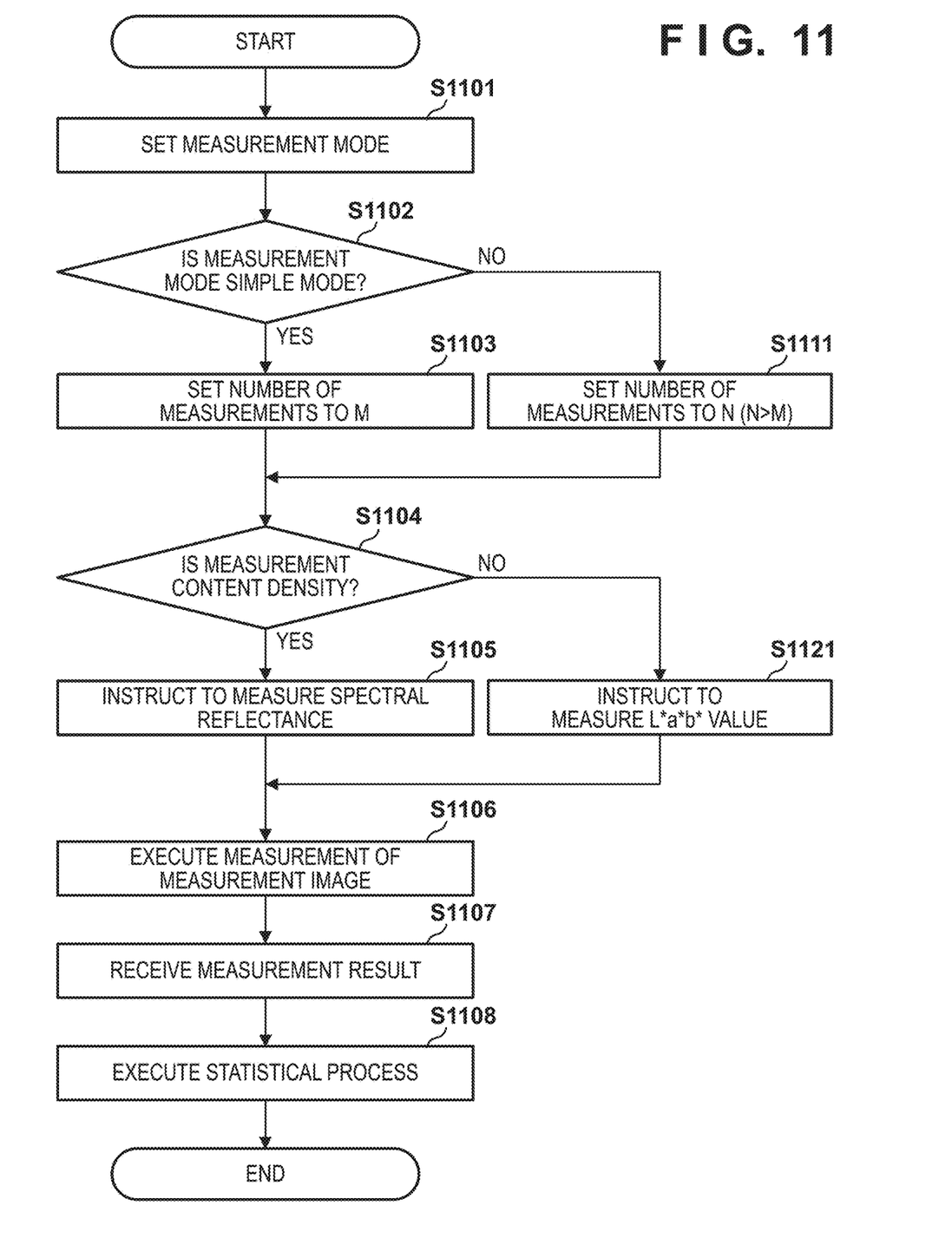
FIG. 11 is a flowchart showing a colorimetry process.

FIG. 11 shows a measurement process executed by the CPU 221.

In step S1101, the CPU 221 (the colorimetric control unit 421) of the image reading apparatus 120 sets the colorimetry mode (measurement mode) of the colorimetry unit 123. For example, when a density correction is performed, the CPU 201 of the image forming apparatus 100 notifies the CPU 221 that the measurement content is density (spectral reflectance) and the measurement mode is the simple mode. The CPU 201 also notifies the CPU 221 that the measured content is L*a*b* values and the measurement mode is the detailed mode when generating or updating a destination profile. Based on this notification, the CPU 221 sets the measurement mode in the CPU 604 of the colorimetry unit 123.

In step S1102, the CPU 221 (the colorimetric control unit 421) determines whether or not the measurement mode is a simple mode. Here, it is assumed that as measurement modes, there is the simple mode and a detailed mode. The simple mode is a mode in which the number of measurements per one measurement image is fewer. The detailed mode is a mode in which the number of measurements per one measurement image is greater. That is, the number of measurements M of the simple mode is fewer than the number of measurements N of the detailed mode (N>M). If the measurement mode is the simple mode, the CPU 221 advances the processing to step S1103.

In step S1103, the CPU 221 (the colorimetric control unit 421) sets the number of measurements to M for the CPU 604, and advances the process to step S1104. If the measurement mode is the detailed mode, the CPU 221 advances the processing to step S1111. In step S1111, the CPU 221 (the colorimetric control unit 421) sets the number of measurements to N for the CPU 604, and advances the process to step S1104.

In step S1104, the CPU 221 (the colorimetric control unit 421) determines whether or not the measurement content is density. If the measurement content is density, the CPU 221 advances the processing to step S1105.

In step S1105, the CPU 221 (the colorimetric control unit 421) instructs the CPU 604 to measure the spectral reflectance, and advances the process to step S1106. If the measurement content is the L*a*b* value, the CPU 221 advances the processing to step S1121. In step S1121, the CPU 221 (the colorimetric control unit 421) instructs the CPU 604 to measure a L*a*b* value, and advances the process to step S1106.

In step S1106, the CPU 221 (the colorimetric control unit 421) executes measurement of the measurement image. When the leading end of the test chart is detected by the sheet sensor 507, the CPU 221 turns on the LED 601 through the CPU 604. As a result, the test chart can be irradiated with white illumination light. The conveyance control unit 422 drives the motor M4 so that the measurement image on the test chart is positioned at the measurement position of the colorimetry sensor 124. The colorimetric control unit 421 drives the motor M3 to cause the colorimetry sensor 124 to detect the trigger patch TP. When the trigger patch TP is detected, the CPU 604 performs the measurement of the measurement image. The CPU 604 measures the measurement images according to the number of measurements set by the CPU 221. The CPU 604 acquires a measurement result from the n light receiving elements of the line sensor 603 and calculates spectral reflectance based on the measurement results. In the simple mode, the CPU 604 stops the light-receiving elements handling the wavelength range of 400 nm to 420 nm, or ignores/cuts the output of those light-receiving elements. In the detailed mode, the CPU 604 operates all n light receiving elements handling the visible wavelength range (visible light range) of 400 nm to 700 nm. If the measurement content is density, the CPU 604 transmits the spectral reflectance to the CPU 221. If the measurement content is an L*a*b* value, the CPU 604 inputs the spectral reflectance into the color matching function to compute the L*a*b* value and transmits the L*a*b* value to the CPU 221. Here, the CPU 604 may apply a statistical process to the spectral data.

In step S1107, the CPU 221 (the colorimetric control unit 421) receives the measurement result (spectral reflectance or L*a*b* value) from the colorimetry unit 123.

Step S1108 is an optional step. In step S1108, the CPU 221 (the colorimetric control unit 421) performs statistical processing on the measurement result (spectral reflectance or L*a*b* value), and transfers the statistical processing result to the CPU 201. The statistical processing may be performed in the CPU 604 or the CPU 201. The CPU 201 performs density correction or generation of a destination profile using the measurement result received from the CPU 221. Statistical processing on the CPU 604 reduces the amount of communication between the CPU 604 and the CPU 221 and also reduces the communication time.

<Technical Concepts Derived from Embodiments>

[Aspects 1 and 16]

As shown in FIG. 1, the image forming system 1 includes the image forming apparatus 100 that forms an image on a sheet, and a reading apparatus that reads an image formed on the sheet (example: the image reading apparatus 120). The LED 601 is an exemplary light source that is provided in the reading apparatus and irradiates a measurement image formed on the sheet with light. The colorimetry sensor 124 is provided in the reading apparatus and is an example of a colorimetry sensor that measures a measurement image by receiving reflected light from a measurement image irradiated with light. The CPU 221 and the CPU 604 are examples of controllers or processor circuits that control colorimetry sensors. As described with reference to FIG. 11, and the like, the CPU 221 and the CPU 604 change the number of colorimetry measurements in which the colorimetry sensors repeatedly measure the same measurement image in accordance with the colorimetry mode of the reading apparatus. Thus, the colorimetric accuracy is improved according to the colorimetry mode, or the time for colorimetry is shortened.

The image reading apparatus 120 and the colorimetry sensor 124 work as a sensor configured to move in a direction orthogonal to a conveying direction in which a conveying unit conveys a sheet, and measure the image on the sheet. The CPU 221 and the CPU 604 work as a controller configured to control the sensor based on measurement modes, the measurement modes including a first measurement mode in which a measurement result corresponding to a predetermined wavelength range is reduced from measurement results of the image, and a second measurement mode in which a measurement result corresponding to the predetermined wavelength range is not reduced from the measurement results of the image. A sampling number of the image by the sensor while the sensor moves in the direction orthogonal to the conveying direction in the first measurement mode is less than a sampling number of the image by the sensor while the sensor moves in the direction orthogonal to the conveying direction in the second measurement mode.

[Aspect 2]

The colorimetry modes of the image reading apparatus 120 may include a first colorimetry mode (e.g., a simple mode) and a second colorimetry mode (e.g., a detailed mode). The simple mode may be referred to as a measurement time priority mode. The detailed mode may be referred to as the absolute accuracy priority mode. The first colorimetry mode is a colorimetry mode that reduces colorimetry components in a wavelength range with relatively low colorimetric result reproducibility among the visible wavelengths from the colorimetric results of the measurement image. The second colorimetry mode is a colorimetry mode that does not reduce colorimetry components in the wavelength range with relatively low colorimetric result reproducibility among the visible wavelengths from the colorimetric results of the measurement image. The number of measurements M corresponding to the first colorimetry mode is less than the number of measurements N corresponding to the second colorimetry mode. Thus, the colorimetric accuracy is lower in the first colorimetry mode, and the time for colorimetry is shorter. The first colorimetry mode may be effective in applications where shortening of time for colorimetry is prioritized over improvement of colorimetric accuracy (example: density correction). Meanwhile, the colorimetric accuracy is higher in the second colorimetry mode, and the time for colorimetry longer. The first colorimetry mode may be effective in applications where improved colorimetric accuracy is a priority (e.g., destination profile generation). In the first colorimetry mode, since colorimetry components in a wavelength range with low reproducibility are reduced, the S/N ratio will be improved. Also, in the second colorimetry mode, the absolute accuracy of colorimetric results will be improved because the measurement target is a wider wavelength range.

[Aspects 3 to 7]

The wavelength range in which the reproducibility of colorimetric results is relatively low may be a wavelength range that is dependent upon the light emission characteristics of the light source. For example, the wavelength range having low reproducibility may be a range on the short wavelength side of the visible wavelengths. For example, the wavelength range having low reproducibility may be a wavelength range of 400 nm to 420 nm of the visible wavelengths. The lower wavelength range may include a wavelength range where the received light intensity is 1/L (example: 0.1) (L>1) or less in relation to a maximum value (example: 1.0) in the "received light intensity" of each different wavelength in the visible wavelengths. Specifically, a wavelength range having low reproducibility may include a wavelength range that is 1/L or less of the maximum value of the "emission intensity" of the visible wavelength range of the light source. This makes it possible to adopt an inexpensive LED as a light source.

[Aspect 8]

The CPU 604 may function as a statistics unit that performs a statistical process on a plurality of colorimetric results measured by a colorimetry sensor for respective measurement images. The CPU 604 may further function as a calculation unit for obtaining colorimetric calculation values of respective measurement images based on statistical process results of the statistics unit. As described above, instead of the CPU 604, the CPU 221 or the CPU 201 may function as the statistics unit and the calculation unit.

[Aspects 9 and 10]

The colorimetric calculation values may be a spectral reflectance of the measurement image or an optical density obtained from the spectral reflectance. The CPU 201 may function as a correction unit for correcting an image forming condition applied to the image forming device based on spectral reflectance or optical density obtained for a plurality of measurement images. Here, as the image forming condition, the intensity of the laser beam for each main scanning position may be adopted.

[Aspects 11 and 12]

A colorimetric calculation value may be an L*a*b* value for the measurement image. The CPU 201 functions as a generation unit that generates or updates a conversion table that converts the color space based on an L*a*b* value. The conversion table may be an ICC profile (in particular a destination profile).

[Aspects 13 to 15]

As shown in FIGS. 7A and 9A, a plurality of measurement images are formed on the sheet in parallel with the first direction (example: the main scanning direction). The colorimetry sensor 124 measures a plurality of measurement images by moving in parallel with the first direction. The colorimetry sensor 124 may once again measure a plurality of measurement images by moving in parallel with a second direction opposite to the first direction. The colorimetry sensor 124 may measure a measurement image, which is a first line in a plurality of measurement images, by moving in parallel with the first direction. The colorimetry sensor 124 may measure a measurement image, which is a second line in the plurality of measurement images, by moving in parallel with a second direction opposite to the first direction. The measurement image of the first line and the measurement image of the second line may be measurement images of the same density. A trigger image (trigger patch TP) that triggers the start of measurement may be provided in front of the measurement image of the first line in the first direction. A trigger image that triggers the start of measurement may be provided in front of the measurement image of the second line in the second direction.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming system comprising:
   an image forming unit configured to form an image on a sheet;
   a conveying unit configured to convey the sheet;
   a sensor configured to move in a direction orthogonal to a conveying direction in which the conveying unit conveys the sheet, and measure the image on the sheet;
   a controller configured to control the sensor based on measurement modes, the measurement modes including:
      a first measurement mode in which a measurement result corresponding to a predetermined wavelength range is reduced from measurement results of the image; and
      a second measurement mode in which a measurement result corresponding to the predetermined wavelength range is not reduced from the measurement results of the image,
   wherein a sampling number of the image by the sensor while the sensor moves in the direction orthogonal to the conveying direction in the first measurement mode is less than a sampling number of the image by the sensor while the sensor moves in the direction orthogonal to the conveying direction in the second measurement mode.

2. The image forming system according to claim 1, wherein
   the predetermined wavelength range is dependent upon light emission characteristics of a light source included in the sensor.

3. The image forming system according to claim 1, wherein
   the predetermined wavelength range is a range on a short wavelength side in visible wavelengths.

4. The image forming system according to claim 1, wherein
   the predetermined wavelength range is a wavelength range of 400 nm to 420 nm of visible wavelengths.

5. The image forming system according to claim 1, wherein
   the predetermined wavelength range includes a wavelength range in which received light intensity is 1/L (L>1) or less in relation to a maximum value of received light intensity of the different wavelengths in visible wavelengths.

6. The image forming system according to claim 1, wherein
   the predetermined wavelength range includes a wavelength range in which emission intensity is 1/L (L>1) or less in relation to a maximum value of the emission intensity of a visible wavelength range of a light source included in the sensor.

7. A reading apparatus comprising:
   a conveying unit configured to convey a sheet;
   a sensor configured to configured to move in a direction orthogonal to a conveying direction in which the conveying unit conveys the sheet, and to measure an image on the sheet;
   a controller configured to control the sensor based on measurement modes, the measurement modes including:
      a first measurement mode in which a measurement result corresponding to a predetermined wavelength range is reduced from measurement results of the image; and
      a second measurement mode in which a measurement result corresponding to the predetermined wavelength range is not reduced from the measurement results of the image,
   wherein a sampling number of the image by the sensor while the sensor moves in the direction orthogonal to the conveying direction in the first measurement mode is less than a sampling number of the image by the sensor while the sensor moves in the direction orthogonal to the conveying direction in the second measurement mode.

* * * * *